United States Patent [19]

Moll

[11] 4,355,696
[45] Oct. 26, 1982

[54] AXLE SUSPENSION FOR THE DRIVEN AXLE OF A ROAD VEHICLE

[75] Inventor: Hans Moll, Gräfelfing, Fed. Rep. of Germany

[73] Assignee: M.A.N. Maschinenfabrik Augsburg Nurnberg Aktiengesellschaft, Munich, Fed. Rep. of Germany

[21] Appl. No.: 176,299

[22] Filed: Aug. 8, 1980

[30] Foreign Application Priority Data

Aug. 11, 1979 [DE] Fed. Rep. of Germany ....... 2932685

[51] Int. Cl.$^3$ .............................................. B60G 9/002
[52] U.S. Cl. ............................. 180/73 TL; 267/11 R; 267/20 A; 280/688
[58] Field of Search ...................... 180/71, 73 R, 73 C, 180/73 D, 73 TL, 73 PT, 75, 88, DIG. 1, DIG. 2; 280/710, 723, 726, 711, 690, 716, 788, 688, 689; 267/11, 20 A, 19 A

[56] References Cited

U.S. PATENT DOCUMENTS 2,369,501  2/1945  Wagner et al. .................... 180/73 R
3,664,452  5/1972  Schaefi ................................ 180/71

FOREIGN PATENT DOCUMENTS 1234542  2/1967  Fed. Rep. of Germany ...... 280/688
1940678  2/1971  Fed. Rep. of Germany ... 180/73 D
2046338  8/1973  Fed. Rep. of Germany .

Primary Examiner—Joseph F. Peters, Jr.
Assistant Examiner—M. J. Hill
Attorney, Agent, or Firm—Scully, Scott, Murphy & Presser

[57] ABSTRACT

Axle suspension for a road vehicle, particularly a motor bus, including a subframe arranged between the drive wheels and the vehicle body. The subframe encompasses a torsionally flexible, flexurally rigid cross support member having rigidly fastened thereto, in a cranklike manner proximate each end, an axial trailing link. The axial trailing links are pivotably supported on the vehicle body at their free ends, and the wheel bearings of the drive wheels are located at approximately the central region of the axial trailing links. A differential is fastened on the vehicle body.

6 Claims, 1 Drawing Figure

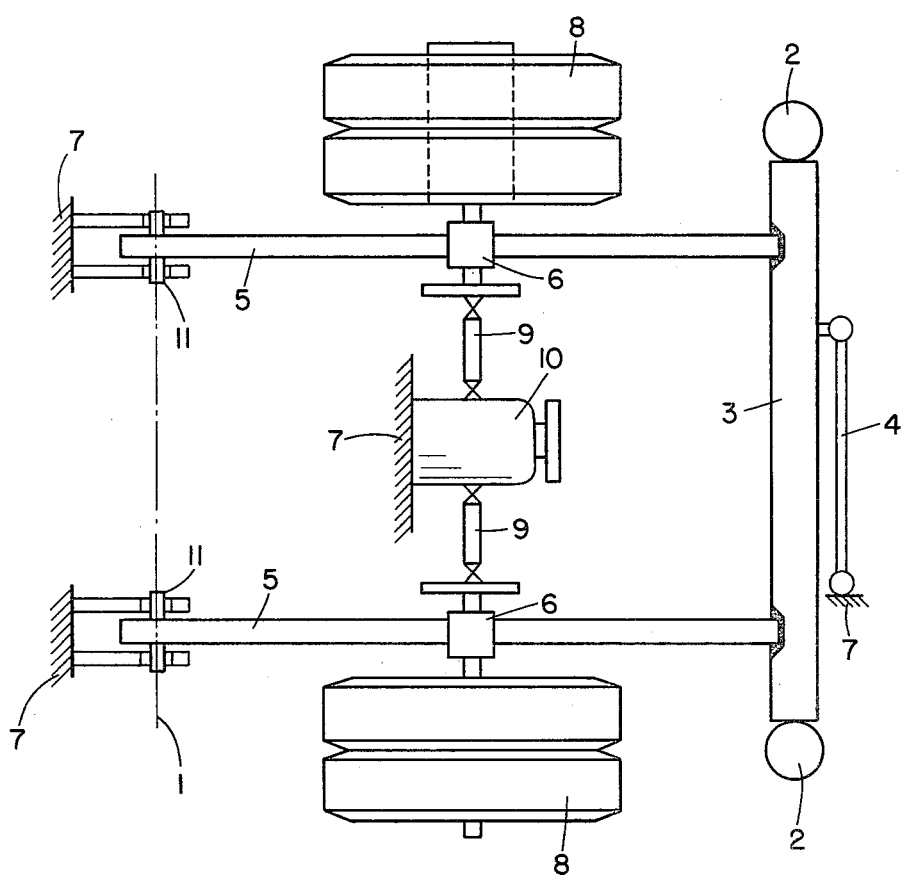

AXLE SUSPENSION FOR THE DRIVEN AXLE OF A ROAD VEHICLE

BACKGROUND OF THE INVENTION

1. Field of the Invention

The present invention relates to an axle suspension for the driven axle of a road vehicle and, more particularly, relates to a motor bus having an auxiliary frame arranged intermediate the drive wheels and the vehicle body or chassis.

2. Discussion of the Prior Art

Presently known axle suspensions for driven axles which employ auxiliary or subframes utilize rigid drive axle members which are attached as entireties to the subframe. This will provide for extensive unsprung weights which will preclude an optimum degree of riding comfort. When it is desired to improve the suspension properties, such as through the application of pneumatic shocks, there will then be required constructionally complex guide provisions for the subframe. Finally, known axle suspensions of this constructional type have the disadvantage in that they require a comparatively large amount of space beneath the vehicle floor whereby, as a result, the body of the vehicle must be arranged at a relatively large height above the roadway.

SUMMARY OF THE INVENTION

Accordingly, it is a primary object of the present invention to provide an axle suspension of the above-mentioned constructional type through which there is achieved a satisfactory optimum guidance and spring support for a drive axle with a concurrent moderate constructional complexity and with a low height of the vehicle.

A more specific object of the present invention is to provide an axle suspension of the type described in which:
(a) the subframe encompasses a torsionally flexible, flexurally rigid cross support member having an axial trailing link cranklike rigidly connected proximate each end thereof;
(b) the support of the subframe in the vehicle body is effectuated through the support of the free ends of the axial trailing links on the vehicle body so as to be pivotable about a transverse axis, and through a track bar;
(c) the wheel bearings of the drive wheels are located approximately in the central region of the axial trailing links;
(d) and the differential is fastened to the vehicle body and connected with the wheels through double cardan shafts.

Through the elimination of one of the rigid axle members interconnecting the two drive wheels, and through the arrangement of the differential gear on the vehicle body or chassis, there are produced minor effective unsprung weights which, as is well known, will exert an extremely beneficial effect on the driving and suspension properties of a vehicle. Due to the rigid connection between the axial trailing linkage and the cross support, the cross support will act as a stabilizer against banking movements of the vehicle which, in turn, will again improve the riding comfort and driving stability. Finally, because of the independent arrangement of the supportive subframe and of the drive elements of the axle in a vertical direction, this will necessitate particularly little constructional space so as to result in a desirably low height of the vehicle floor above the roadway.

A further feature of the present invention resides in the provision of an axle suspension affording the advantage that stability against sideways tilt is particularly high.

The arrangement of the bearing points of the axle suspension provides an advantage in that the forces which are to be transmitted from the drive axle to the vehicle body are directly introduced into the vehicle body at the location in which they are best absorbed, in essence, in the side panel of the vehicle having a high load capacity in the vertical plane thereof.

The cross support pursuant to the invention has a configuration providing the advantage of a particularly high flexural rigidity.

BRIEF DESCRIPTION OF THE DRAWING

Reference may now be had to the following detailed description of a preferred embodiment of the present invention in conjunction with the single FIGURE of the accompanying drawing showing a plan view illustrating an axle suspension for the driven axle of a vehicle body.

DETAILED DESCRIPTION

In the drawing, the vehicle body is merely indicated by individual locating points 7. The drive wheels 8 of the vehicle are articulated to the vehicle body 7 through the intermediary of an open subframe. The auxiliary or subframe encompasses a torsionally flexible, flexurally rigid cross support member 3 with a preferably double-T cross-section. Rigidly fastened proximate the ends of the cross support member 3 are axial trailing links 5 in a crank-like manner. The axially trailing links 5 are connected to the vehicle body 7 at the bearing points 11 so as to be pivotable about a transverse axis 1. Lateral guidance for the subframe is assumed by a track bar 4 which is linked at one end to the vehicle body 7 and at the other end to the cross support member 3. The suspension of the subframe and as a result, of the drive axle on the vehicle body is effected by means of non-guiding springs 2, in effect, such as coiled springs or pneumatic shocks which are arranged at the ends of the cross support member 3. In this arrangement, the cross support member 3 may be outwardly extended far enough for the springs 2 to lie approximately on the track of the drive wheels 8. The drive wheels 8 are supported in wheel bearings 6 which are arranged approximately in the central region of the axial trailing links 5. The differential 10 is fastened to the vehicle body 7 in the center of the vehicle. From the differential 10, double cardan shafts 9 lead to the respective wheel bearings 6. Arranged inboard of the wheel bearings 6 towards the center of the vehicle are disc brakes for the drive wheels 8. This arrangement of the disc brakes inboard of the wheel bearings 6 is rendered possible by the elimination of an axle member which leaves sufficient space in that area. Thereby, it is possible to again save a corresponding amount of space for brakes in the hub of the drive wheels 8 so that these can be selected to be relatively small which again provides the advantage with regard to a low floor height for the vehicle above the roadway.

The axial trailing links 5 can also be bent in a manner whereby the bearing points 11 on the vehicle body 7 and the abutments of the springs 2 are located at a lower level than the wheel bearings 6.

What is claimed is:

1. In an axle suspension for the driven axle of a road vehicle such as a motor bus, including a subframe arranged between the drive wheels and the vehicle body of said vehicle; the improvement comprising:
   (a) said subframe including a torsionally flexible, flexurally rigid cross support member; and a pair of axial trailing links, one end of each of said links being rigidly connected in a cranklike manner proximate each end of said member;
   (b) means supporting the free ends of said axial trailing links on the vehicle body for pivotal movement about a transverse axis; and a track bar to provide support for said subframe in the vehicle body;
   (c) wheel bearings for said drive wheels being arranged approximately in the central region of said axial trailing links;
   (d) and a differential being fastened to said vehicle body; and double cardan shafts connecting said differential with said wheels.

2. Axle suspension as claimed in claim 1, comprising non-guiding springs supporting said subframe on the vehicle body, said springs being arranged proximate the ends of the cross support member.

3. Axle suspension as claimed in claim 2, said springs being arranged approximately along the track of the drive wheels.

4. Axle suspension as claimed in claim 2 or 3, said axial trailing links having bearing points on the vehicle body and said springs having support points located lower than the wheel bearings.

5. Axle suspension as claimed in claim 4, said bearing points of the axial trailing links being located in direct proximity to the side panels of the vehicle.

6. Axle suspension as claimed in claim 1, said cross support member having a double-T profile in cross-section.

* * * * *